US009989875B2

(12) United States Patent
Nakano

(10) Patent No.: US 9,989,875 B2
(45) Date of Patent: Jun. 5, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Toshimitsu Nakano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/821,467

(22) Filed: Aug. 7, 2015

(65) Prior Publication Data
US 2016/0048099 A1 Feb. 18, 2016

(30) Foreign Application Priority Data

Aug. 14, 2014 (JP) .................................. 2014-165038

(51) Int. Cl.
*G06K 15/00* (2006.01)
*H04N 1/40* (2006.01)
(Continued)

(52) U.S. Cl.
CPC ......... *G03G 15/0121* (2013.01); *G03G 15/36* (2013.01); *G03G 15/556* (2013.01); *G06F 3/12* (2013.01); *H04N 1/00* (2013.01)

(58) Field of Classification Search
CPC .. G03G 15/0121; G03G 15/36; G03G 15/556; G06F 3/12; H04N 1/00
(Continued)

(56) References Cited

U.S. PATENT DOCUMENTS 8,040,557 B2 * 10/2011 Shibaki ................ H04N 1/4072
358/1.1
8,040,565 B2 10/2011 Shibaki et al. ................ 358/2.1
(Continued)

FOREIGN PATENT DOCUMENTS

JP 2007-114224 5/2007
JP 2009-037283 2/2009
(Continued)

OTHER PUBLICATIONS

Notification of Reasons for Refusal dated Apr. 17, 2018 in counterpart JP Application No. 2014-165083 with English translation.

*Primary Examiner* — Quang N Vo
(74) *Attorney, Agent, or Firm* — Fitzpatrick, Cella, Harper & Scinto

(57) ABSTRACT

In the conventional toner save processing, in the case where the color of each element, such as a character, a graphics, and an image, constituting an image is a pale color or bright color, visual recognizability will be degraded even by maintaining the density of an edge portion of each element. An image processing apparatus that performs color material save processing to perform color printing while suppressing a color material consumption compared to that at the time of normal printing, includes an edge detection unit configured to detect an edge pixel constituting an edge of an object within input image data, and a density adjustment unit configured to convert the color of a detected edge pixel into an achromatic color and to decrease the density of the color of a non-edge pixel, which is a pixel other than the edge pixel of the object.

19 Claims, 13 Drawing Sheets

(51) Int. Cl.
   *G03G 15/01*   (2006.01)
   *G03G 15/36*   (2006.01)
   *G03G 15/00*   (2006.01)
   *G06F 3/12*    (2006.01)
   *H04N 1/00*    (2006.01)

(58) Field of Classification Search
   USPC .......................................... 358/2.1, 1.9, 3.06
   See application file for complete search history.

(56) References Cited

U.S. PATENT DOCUMENTS

| | | | |
|---|---|---|---|
| 8,958,119 B2 | 2/2015 | Kawaguchi | G06K 15/1869 |
| 2005/0078867 A1* | 4/2005 | Kanno | H04N 1/40012 |
| | | | 382/163 |
| 2011/0064436 A1* | 3/2011 | Kimura | G03G 15/5062 |
| | | | 399/67 |
| 2014/0168710 A1* | 6/2014 | Ikari | H04N 1/405 |
| | | | 358/2.1 |

FOREIGN PATENT DOCUMENTS

| | | |
|---|---|---|
| JP | 2009-232096 | 10/2009 |
| JP | 2012-109897 A1 | 6/2012 |
| JP | 2014-107833 | 6/2014 |

\* cited by examiner

| G (i-1, j-1) | G (i, j-1) | G (i+1, j-1) |
|---|---|---|
| G (i-1, j) | G (i, j) | G (i+1, j) |
| G (i-1, j+1) | G (i, j+1) | G (i+1, j+1) |

FIG.5

IMAGE PROCESSING APPARATUS, IMAGE PROCESSING METHOD, AND STORAGE MEDIUM

BACKGROUND OF THE INVENTION

Field of the Invention

The present invention relates to processing to suppress a color material consumption.

Description of the Related Art

Some printers adopting an electrophotographic scheme include a toner save mode in which printing is performed while suppressing a toner consumption in the case where test printing or the like is performed. In the toner save mode, the toner consumption is reduced by decreasing the density of an image compared to that in normal printing. Then, a technique is known that suppresses the visual recognizability and legibility of an image from being degraded while suppressing a toner consumption by detecting edge portions within the image in the toner save mode, decreasing the density of the portions other than the edge portions, and maintaining the density of the colors of the edge portions or changing the colors of the edge portions into vivid colors (Japanese Patent Laid-Open No. 2012-109897).

The toner save processing described in Japanese Patent Laid-Open No. 2012-109897 has such a problem that visual recognizability is degraded in the case where the color of each object, such as a character, a graphics, and an image (photo), constituting an image is a pale color or bright color even by maintaining the density of the edge portion of each object.

SUMMARY OF THE INVENTION

An image processing apparatus according to the present invention is an image processing apparatus that performs color material save processing to perform color printing while suppressing a color material consumption compared to that at the time of normal printing, and includes an edge detection unit configured to detect an edge pixel constituting an edge of an object within input image data, and a density adjustment unit configured to convert the color of the detected edge pixel into an achromatic color and to decrease the density of the color of a non-edge pixel that is a pixel other than the edge pixel of the object.

Further features of the present invention will become apparent from the following description of exemplary embodiments (with reference to the attached drawings).

BRIEF DESCRIPTION OF THE DRAWINGS

FIG. 5 is a diagram showing a relationship between a pixel of interest and adjacent pixels;

DESCRIPTION OF THE EMBODIMENTS

Hereinafter, aspects for embodying the present invention are explained by using the drawings. Configurations shown in the following embodiments are merely exemplary and the present invention is not limited to the configurations shown schematically.

First Embodiment

Figure 1:
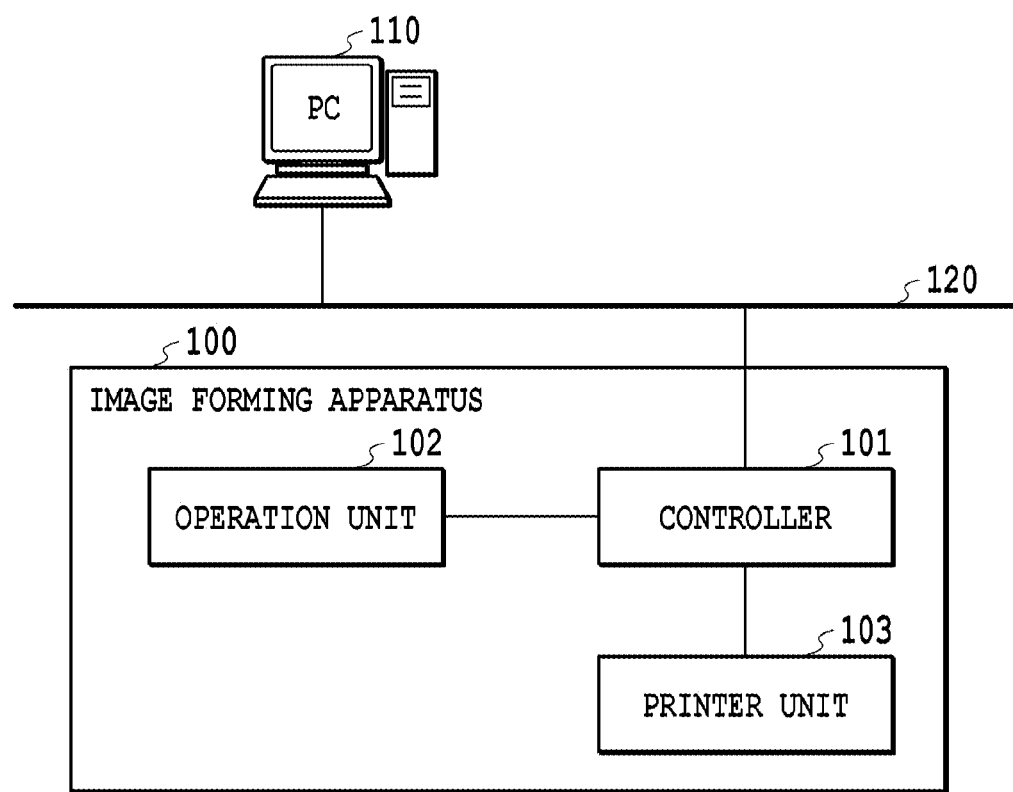
FIG. 1 is a diagram showing an example of a configuration of a printing system according to a first embodiment.

FIG. 1 is a diagram showing an example of a configuration of a printing system according to the present embodiment. The printing system shown in FIG. 1 includes an image forming apparatus 100 and a host computer (PC) 110 and both are connected to each other via a network 120, such as a LAN. As the connection method, for example, it is possible to apply the serial transmission method, such as USB, and the parallel transmission method, such as Centronics and SCSI.

The image forming apparatus 100 includes a controller 101, an operation unit 102, and a printer unit 103.

The controller 101 controls the general operation of the image forming apparatus 100. Details thereof will be described later.

The operation unit 102 includes a key for a user to give various instructions and, for example, a liquid crystal monitor to display various kinds of information that a user should be notified of. In the case where the liquid crystal monitor has a touch screen function, it is also possible to handle user's instructions given by using the touch screen as an input of the key.

The printer unit 103 is an image output device that performs color printing and forms an image on a printing medium, such as paper, by the electrophotographic scheme. Specifically, the printer unit 103 forms an electrostatic latent image in accordance with image data received from the controller 101 and forms a single-color toner image by developing the electrostatic latent image. Then, the printer unit 103 forms a multicolored toner image by superimposing single-color toner images, transfers the multicolored toner image to a printing medium, and fixes the multicolored toner image on the printing medium.

The PC 110 has a configuration of a general computer and transmits print data that is generated by a printer driver, not shown, to the image forming apparatus 100 via the network 120.

Figure 2:
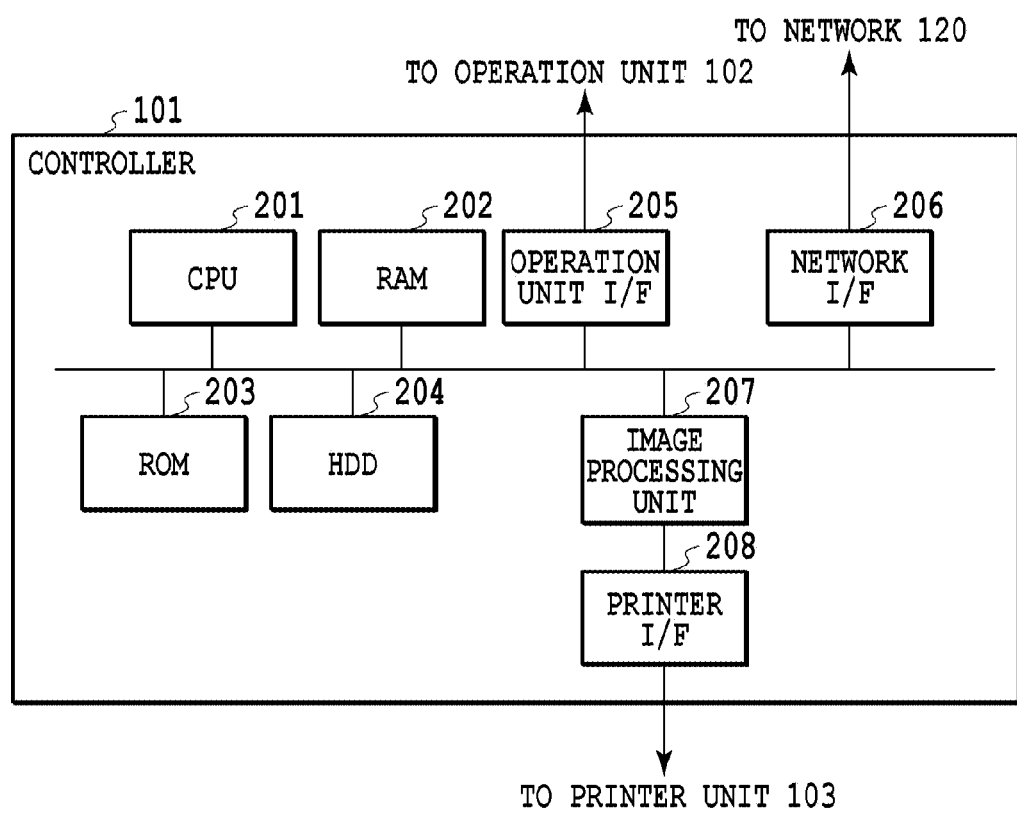
FIG. 2 is a block diagram showing an internal configuration of a controller of an image forming apparatus.

FIG. 2 is a block diagram showing an internal configuration of the controller 101 of the image forming apparatus 100.

A CPU 201 comprehensively controls various kinds of processing, such as image processing that is performed within the controller 101, as well as comprehensively controlling accesses with various devices based on control programs or the like stored in a ROM 203.

A RAM 202 is a system work memory for the CPU 201 to operate and is also used as a memory for temporarily storing image data.

An HDD 204 is a hard disk drive and stores system software and image data.

An operation unit I/F 205 is an interface with the operation unit 102 and acquires information that is input via the operation unit 102, as well as outputting image data to be displayed in the operation unit 102 to the operation unit 102.

A network I/F 206 is an interface with the network 120 and performs transmission and reception of image data and various kinds of information.

An image processing unit 207 obtains intermediate data from print data (PDL data) that is transmitted from the PC 110 and generates bitmap (multivalued) image data and attribute data. Further, the image processing unit 207 performs necessary image processing on image data while referring to the attribute data attached to the image data. The image data on which the image processing has been performed is output to the printer unit 103 via a printer I/F 208.

Figure 3:
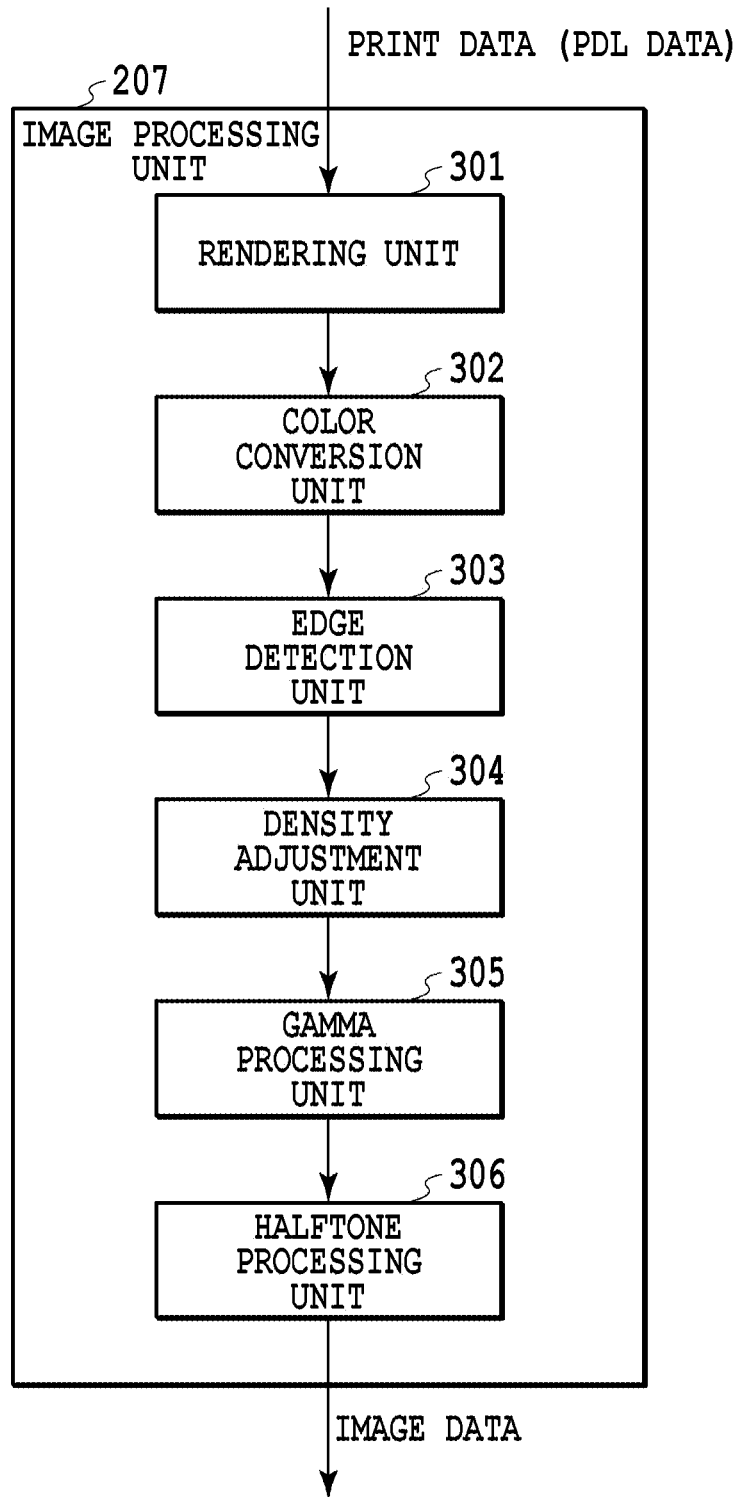
FIG. 3 is a block diagram showing an internal configuration of an image processing unit.

FIG. 3 is a block diagram showing an internal configuration of the image processing unit 207. The image processing unit 207 includes a rendering unit 301, a color conversion unit 302, an edge detection unit 303, a density adjustment unit 304, a gamma processing unit 305, and a halftone processing unit 306.

The rendering unit 301 analyzes the print data (PDL data) transmitted from the PC 110 and generates bitmap image data and its attribute data. The bitmap image data is image data of a drawing bitmap in which a pixel pattern to be drawn in accordance with the resolution of the printer unit 103 is formed from drawing information of the print data (PDL command), and the drawing bitmap including information on the color in which each pixel is drawn. The attribute data is attribute bitmap data storing attribute information to be correspondent to each pixel of the drawing bitmap, wherein the attribute information includes information indicating each element (object) of the print data being associated with a character, line graphics, image (Photo) or background, and edge information. The attribute information is, for example, 8-bit data. Then, the kind of each object is represented by three high-order bits (first to third bits), for example, in such a manner that the background is represented by "000", a character by "001", a line by "010", a graphics by "011", an image (Photo) by "100", and so on. Then, the edge information is represented by the next one bit (fourth bit), for example, in such a manner that an edge is represented by "1" and a portion other than an edge by "0". The remaining four bits are used as spare bits or used to represent another piece of information.

The color conversion unit 302 converts the color information of the bitmap image data that is generated by the rendering unit 301 into the color space of CMYK, which are colors of toner used in the printer unit 103 by using a color conversion LUT or by performing a matrix calculation. The converted image data has an 8-bit value for each of CMYK for each pixel.

The edge detection unit 303 detects an edge from the input image data (image data output from the color conversion unit 302) and generates edge information indicating whether or not each pixel of the input image data is a pixel constituting an edge. Details of edge detection processing in the edge detection unit 303 will be described later. The generated edge information forms part of the attribute information as described above.

The density adjustment unit 304 adjusts the density of image data based on the operation mode (e.g., toner save mode) specified via the operation unit 102, and the density adjustment value of the drawing information of the print data.

The gamma processing unit 305 performs gamma adjustment corresponding to the kind of dither that is applied to the image data.

The halftone processing unit 306 converts the image data (here, 8 bits) on which gamma adjustment has been performed by pseudo halftone processing using the dither processing into image data (here, 4 bits) that the printer unit 103 can make use of. The image data on which halftone processing has been performed is sent to the printer unit 103 via the printer I/F 208.

<Edge Detection Processing>

Figure 4:
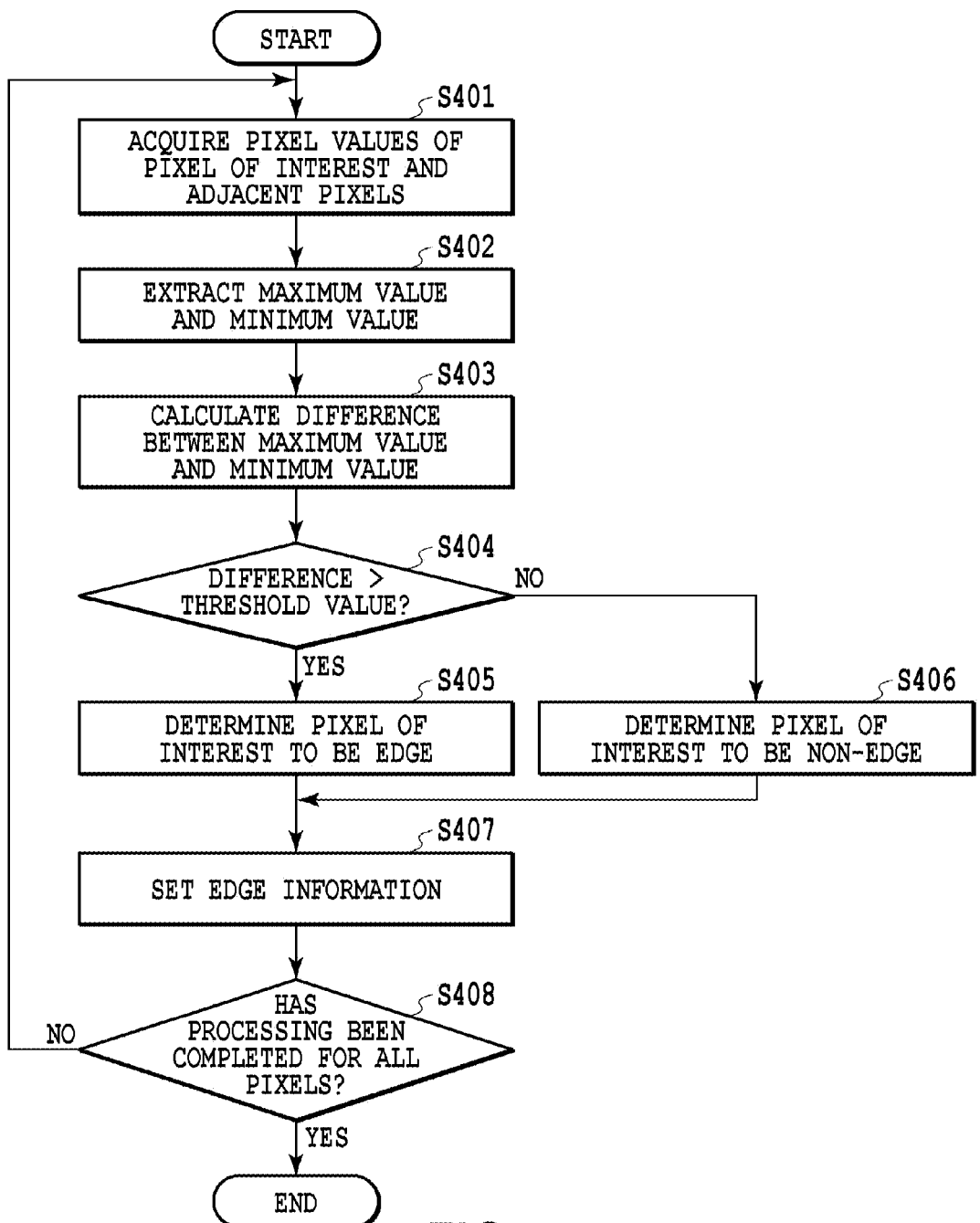
FIG. 4 is a flowchart showing a flow of edge detection processing.

Next, the edge detection processing in the edge detection unit 303 is explained in detail. FIG. 4 is a flowchart showing a flow of the edge detection processing. The series of processing is performed by the CPU 201 executing computer executable programs in which the procedures shown below are described after reading the programs from the ROM 203 onto the RAM 202.

At step 401, the edge detection unit 303 acquires pixel values of a pixel of interest within the input image data and adjacent pixels of the pixel of interest. Here, the adjacent pixels are a plurality of pixels located within a predetermined range of the pixel of interest and in the present embodiment, the adjacent pixels refer to eight pixels within an area of 3×3 pixels with the pixel of interest as a center. FIG. 5 is a diagram showing a relationship between the pixel of interest and the adjacent pixels. In FIG. 5, a pixel located at the center and represented in gray is a pixel of interest $G_{(i, j)}$ and eight pixels that surround the pixel of interest $G_{(i, j)}$ are adjacent pixels $G_{(i-1, j-1)}$, $G_{(i, j-1)}$, $G_{(i+1, j-1)}$, $G_{(i-1, j)}$ $G_{(i+1, j)}$, $G_{(i-1, j+1)}$, $G_{(i, j+1)}$, and $G_{(i+1, j+1)}$. At this step, the pixel value of the pixel of interest and the pixel values of the eight adjacent pixels are acquired as a result.

At step 402, the edge detection unit 303 extracts a maximum value $G_{max}$ and a minimum value $G_{min}$ from the pixel values of the pixel of interest and the adjacent pixels acquired at step 401.

At step 403, the edge detection unit 303 calculates a difference between the maximum value $G_{max}$ and the minimum value $G_{min}$ extracted at step 402.

At step 404, the edge detection unit 303 determines whether the value of the difference calculated at step 403 is greater than a threshold value determined in advance. In the case where the value of the difference is greater than the threshold value, the processing proceeds to step 405. On the other hand, in the case where the value of the difference is not greater than the threshold value, the processing proceeds to step 406.

At step 405, the edge detection unit 303 determines that the pixel of interest $G_{(i, j)}$ is an edge (a pixel constituting an edge).

At step 406, the edge detection unit 303 determines that the pixel of interest $G_{(i, j)}$ is a non-edge (not a pixel constituting an edge).

At step 407, the edge detection unit 303 sets edge information corresponding to the pixel of interest $G_{(i, j)}$ in accordance with the determination results at step 405 and step 406. In other words, in the case where it is determined that the pixel of interest $G_{(i, j)}$ is a pixel that constitutes an edge, "1" is set to the edge information, and in the case where it is determined that the pixel of interest G) is a pixel that does not constitute an edge, "0" is set to the edge information.

At step 408, the edge detection unit 303 determines whether or not the edge detection processing has been performed on all the pixels of the image data. In the case where there is a pixel on which the edge detection processing has not been performed yet, the processing returns to step 401, and the next pixel is set to the pixel of interest and the processing is continued. On the other hand, in the case where there is no pixel on which the edge detection processing has not been performed yet, the present processing is terminated.

Figure 6:
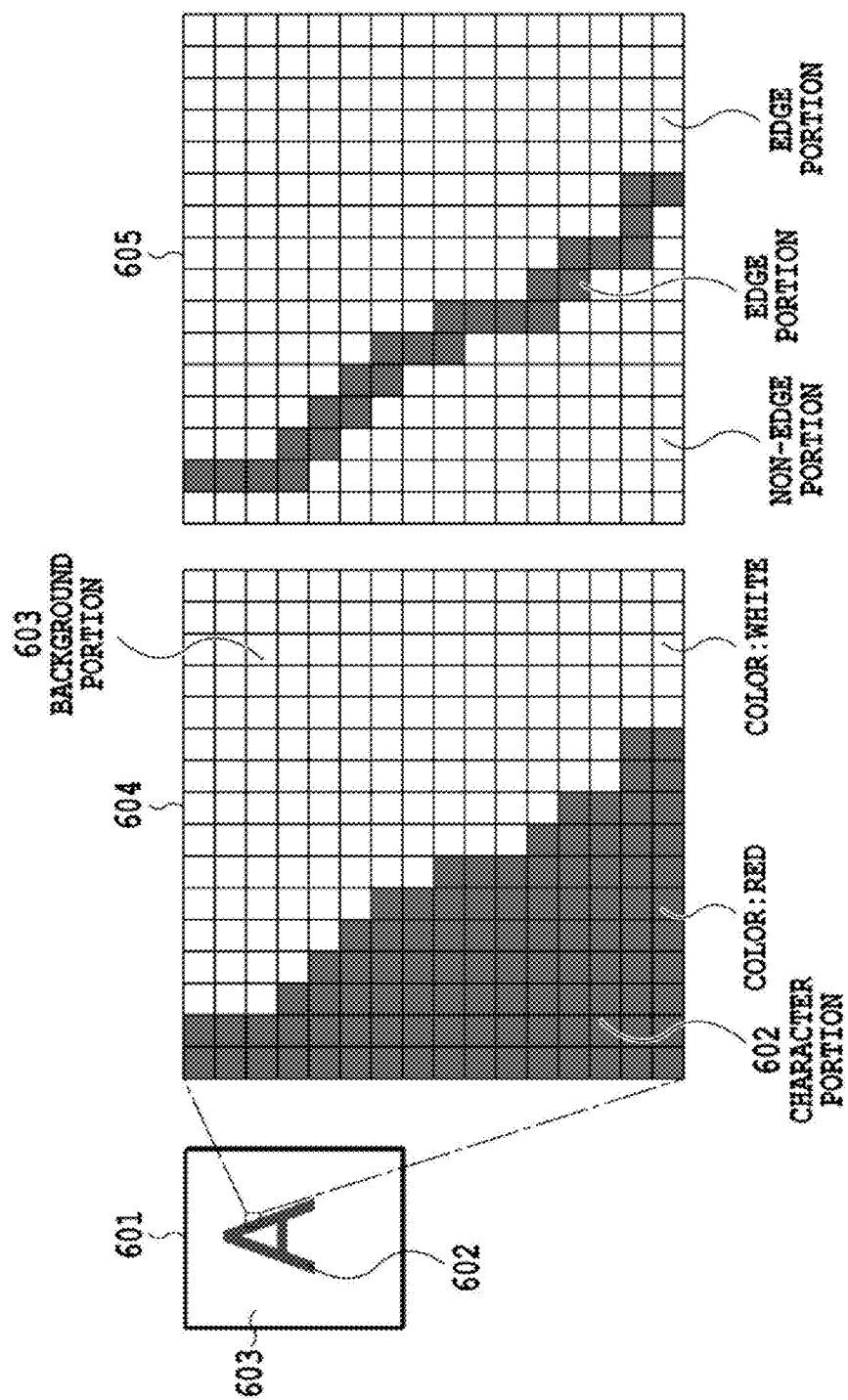
FIG. 6 is a diagram showing an example of the results of the edge detection processing.

The above is the contents of the edge detection processing. The edge detection processing is performed for each color of CMYK. FIG. 6 is a diagram showing an example of the results of the edge detection processing. In FIG. 6, input image data 601 consists of a character portion 602 of alphabet "A" and a white background portion 603. In FIG. 6, reference numeral 604 denotes a diagram obtained by enlarging part of the input image data 601 and shows that the character portion 602 consisting of dark gray cells has a signal value of red (C: 0%, M: 100%, Y: 100%, K: 0%) and the background portion 603 consisting of white cells has a signal value of white (C=M=Y=K: 0%). Further, reference numeral 605 denotes the results of performing the edge detection processing on each pixel in the enlarged view 604 and it is determined that the pixels at the boundary portion between the character portion 602 (red) and the background portion (white) are pixels constituting edges.

In the present embodiment, the maximum value and the minimum value are extracted from the pixel values within the area of 3×3 pixels with the pixel of interest as a center, and then, the edge determination is performed based on the difference, but the edge determination is not limited to this. For example, it may also be possible to perform the edge determination by finding the slope of the pixel value by calculating the first derivation with respect to the adjacent pixel in each pixel of the image data.

<Toner Save Mode>

Figure 7:
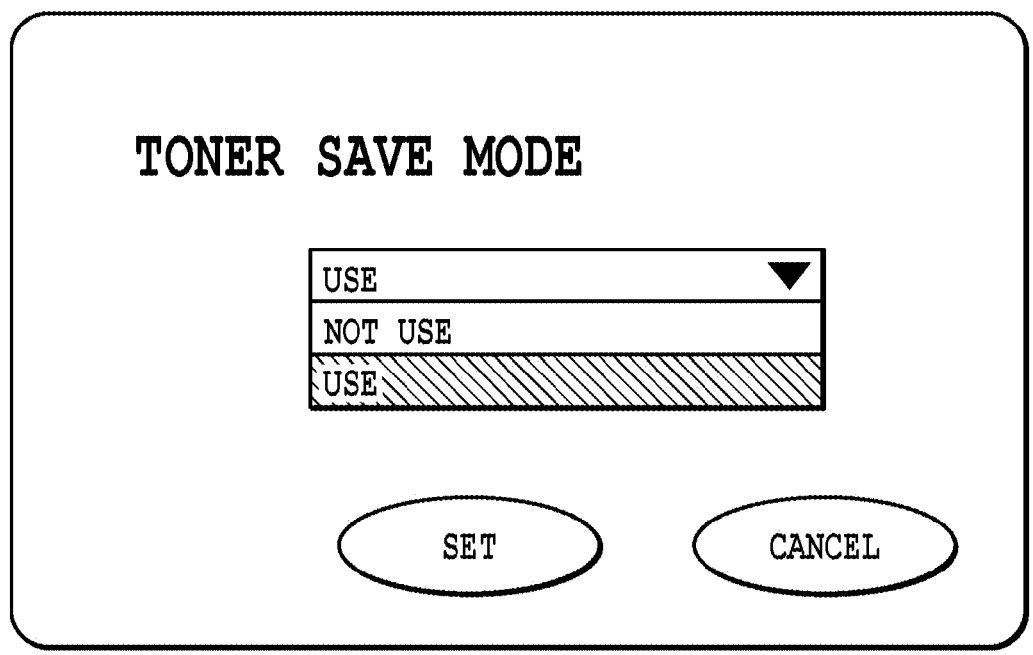
FIG. 7 is a diagram showing an example of a setting screen for specifying a toner save mode.

Next, the toner save mode that is the premise of the present embodiment and which is the operation mode to perform color printing while suppressing the toner consumption compared to that at the time of normal printing is explained. The toner save mode is the operation mode that a user selects in the case where the user desires to perform printing while suppressing the toner consumption and is specified via the operation unit 102 of the image forming apparatus 100 or by using the printer driver of the PC 110. FIG. 7 is a diagram showing an example of a setting screen for specifying the toner save mode and a user specifies the toner save mode via such a setting screen. In the case where the toner save mode is specified, density adjustment processing (hereinafter, toner save processing) to save toner, to be described below, is performed in the density adjustment unit 304.

Figure 8:
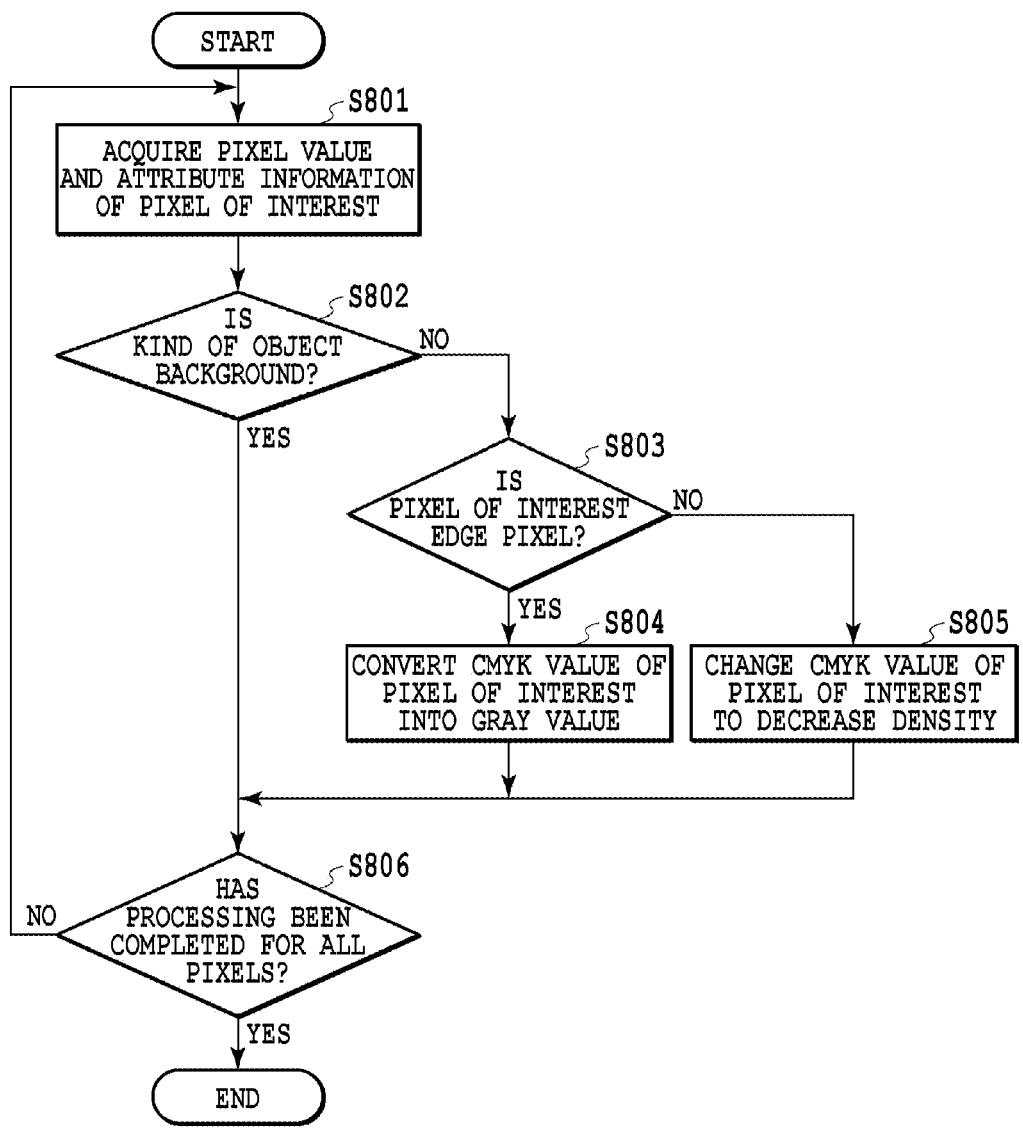
FIG. 8 is a flowchart showing a flow of toner save processing according to the first embodiment.

FIG. 8 is a flowchart showing a flow of the toner save processing according to the present embodiment.

At step 801, the density adjustment unit 304 determines a pixel (pixel of interest) from the input image data and acquires its pixel value (image signal) and attribute information.

At step 802, the density adjustment unit 304 determines whether or not the kind of the object to which the pixel of interest belongs is the background by referring to the acquired attribute information. In the present embodiment, whether the three high-order bits of the attribute information are "000" representing the background is determined as a result. In the case where the kind of the object to which the pixel of interest belongs to is not the background, the processing proceeds to step 803. On the other hand, in the case where the kind of the object to which the pixel of interest belongs to is the background, the pixel value is "0 (white pixel)" and toner is not used, and therefore, the processing proceeds to step 806.

At step 803, the density adjustment unit 304 determines whether or not the pixel of interest is a pixel that constitutes an edge (hereinafter, an edge pixel) by referring to the acquired attribute information. In the present embodiment, whether the fourth bit of the attribute information is "1" representing an edge is determined as a result. In the case where the pixel of interest is an edge pixel, the processing proceeds to step 804. On the other hand, in the case where the pixel of interest is a pixel other than the edge pixel (hereinafter, a non-edge pixel), the processing proceeds to step 805.

At step 804, the density adjustment unit 304 converts the pixel value of the pixel of interest that is represented by the CMYK value acquired at step 801 into a Gray value (value of K alone). Here, the conversion from the CMYK value into the Gray value is carried out by using, for example, a conversion expression expressed by expression (1) below.

$$\text{Gray} = K + (C + M + Y)/3 \qquad \text{expression (1)}$$

The conversion into the Gray value can be carried out by an expression other than the above-described expression (1), for example, by expression (2) or expression (3) below.

$$\text{Gray} = K + \text{Max}(C, M, Y) \qquad \text{expression (2)}$$

$$\text{Gray} = K + (a*C + b*M + c*Y), (a,b,c \text{ are constants}) \qquad \text{expression (3)}$$

Figure 9:
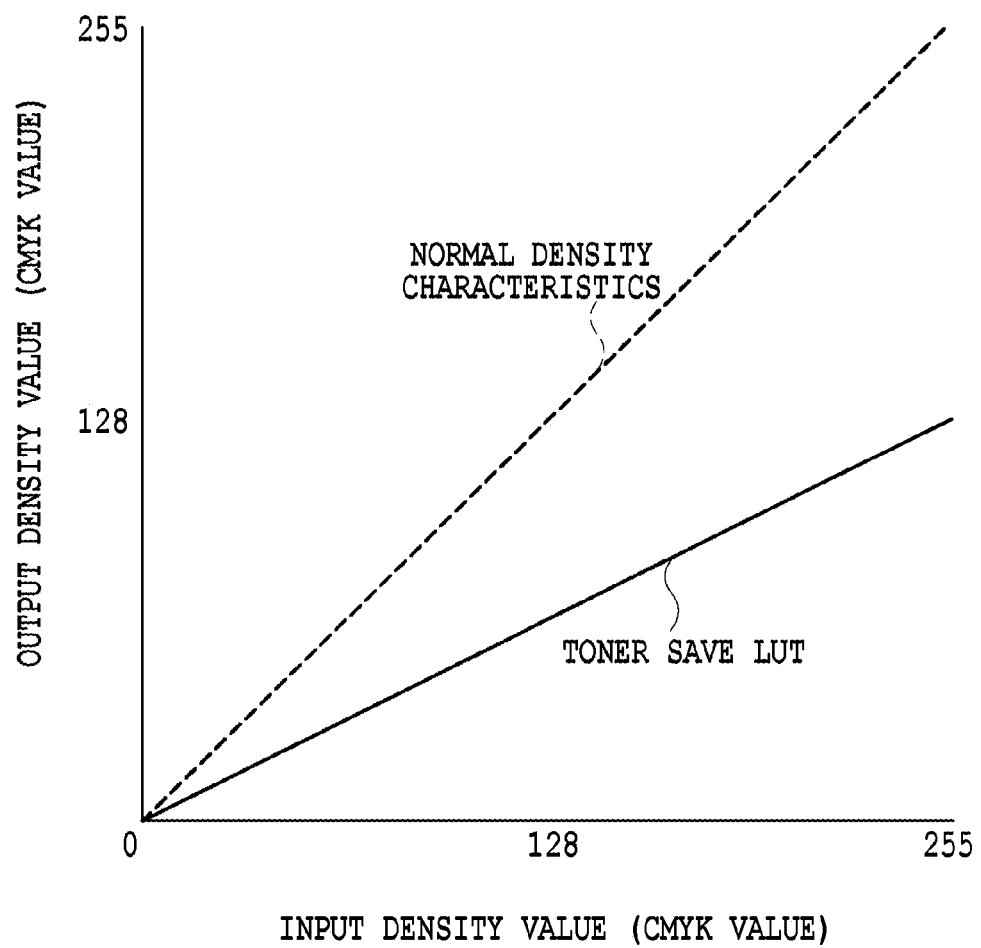
FIG. 9 is a graph representing density characteristics of a toner save LUT.

It may also be possible to select and use one of these expressions in accordance with the characteristics of each color. At step 805, the density adjustment unit 304 changes the CMYK value of the pixel of interest so that the density become lower (density is decreased). Specifically, density conversion is carried out by using a toner save lookup table (LUT) in which input density values and output density values prepared in advance are associated with each other. FIG. 9 is a graph representing the density characteristics of the toner save LUT and the horizontal axis represents the input density value (CMYK value) and the vertical axis represents the output density value (CMYK value). In FIG. 9, the broken line indicates the density characteristics of a normal printing LUT and the solid line indicates the density characteristics of the toner save LUT that decreases the density in the normal printing to 50%. It may be possible to select any degree in which the density is decreased at the time of saving toner, and 60%, 40%, etc., may be accepted. Further, it may also possible to use the same toner save LUT in common to all the colors of CMYK or to provide different toner save LUTs in accordance with the characteristics of each color. It is possible to reduce the toner consumption by converting the pixel value into a pixel value with a lower density to decrease the density to a desired density by using such a toner save LUT.

At step 806, the density adjustment unit 304 determines whether or not the processing has been completed for all the pixels of the image data. In the case where there is a pixel on which the processing has not been performed yet, the processing returns to step 801, and the next pixel of interest is determined and the processing is continued. On the other hand, in the case where the processing has been completed for all the pixels, the present processing is terminated.

The above is the contents of the toner save processing according to the present embodiment. Due to this toner save processing, in the edge portion, the chromatic color is converted into an achromatic color (Gray value), and therefore, the lightness of the edge portion becomes lower than that of the chromatic color. Then, in the non-edge portion, the density is decreased, and therefore, the lightness becomes high. As a result of this, the contrast between the edge portion and the non-edge portion becomes strong and the shape (contour) of the object within the image becomes clear, and therefore, visual recognizability improves.

Figure 10A:
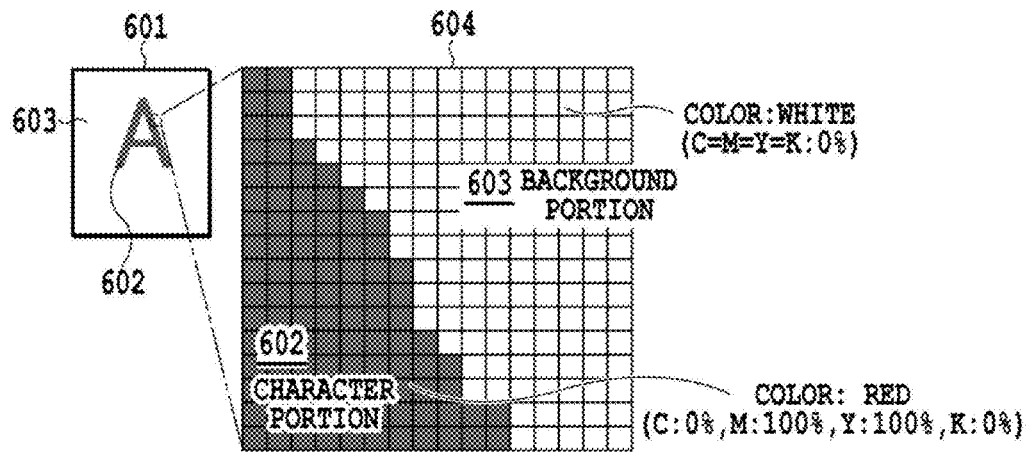
FIGS. 10A, 10B, and 10C are diagrams explaining a generation process of output image data for printing in the toner save mode.
Figure 10B:
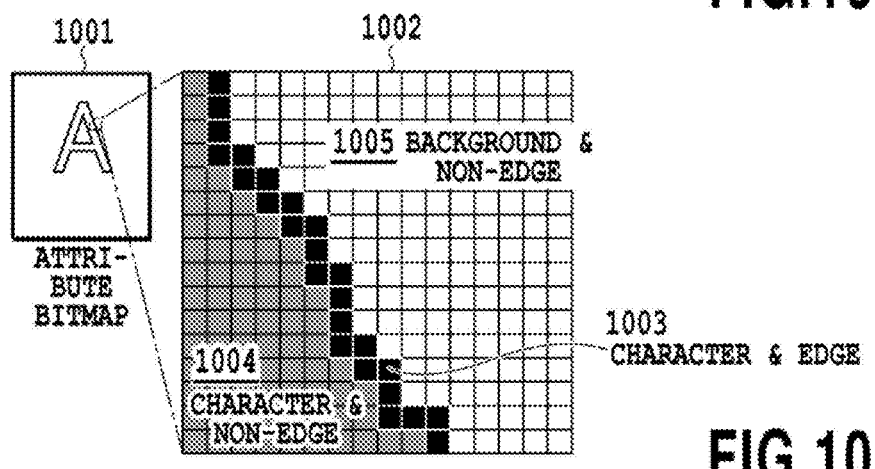
Figure 10C:
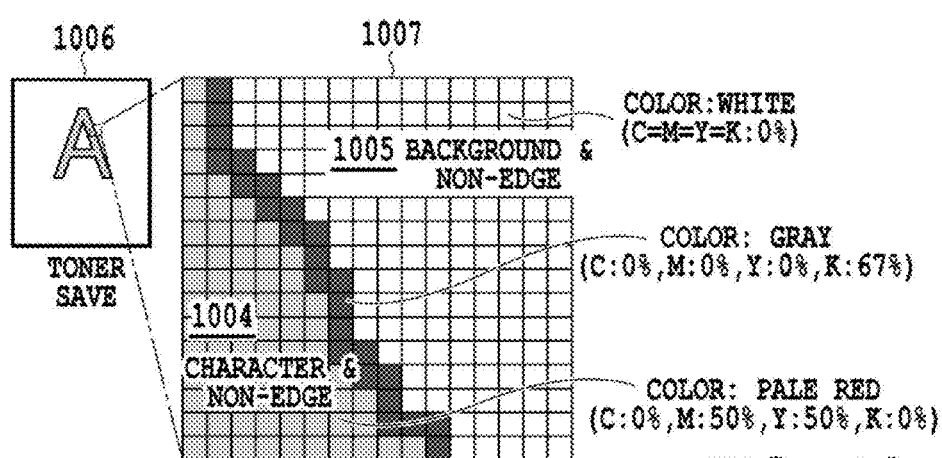

FIGS. 10A, 10B, and 10C are diagrams explaining the generation process of output image data for printing in the toner save mode by taking the case of the input image data in FIG. 6 described previously as an example. For the portions in common to those in FIG. 6, the same reference symbols are used.

FIG. 10A shows input image data of the CMYK value converted by the color conversion unit 302 and its enlargement view. The input image data and its enlarged view are the same as the input image data 601 and its enlarged view 604 in FIG. 6 and the character portion 602 has a signal value of red (C: 0%, M: 100%, Y: 100%, K: 0%) and the background portion 603 has a signal value of white (C=M=Y=K: 0%).

FIG. 10B shows an attribute bitmap 1001 and its enlarged view 1002 obtained by performing edge detection processing on the input image data 601. In the case where edge detection processing is performed on the input image data 601, the boundary between the character portion 602 and the background portion 603 is detected as an edge. As a result of this, as shown in the enlarged view 1002 in FIG. 10B, the area is separated into three areas: a character and edge area 1003, a character and non-edge area 1004, and a background and non-edge area 1005.

FIG. 10C shows output image data 1006 and its enlarged view 1007 obtained by performing toner save processing on the input image data 601. First, as to the pixel in the character and edge area 1003, the signal value of red, which is the color of the character portion 602, is converted into the signal value of Gray alone, and the color changes into gray (C: 0%, M: 100%, Y: 100%, K: 67%). Then, as to the pixel in the character and non-edge area 1004, the signal value of red, which is the color of the character portion 602, is converted into the signal value of pale red (C:0%, M: 50%, Y: 50%, K: 0%) by using the toner save LUT. Further, as to the pixel in the background and non-edge area 1005, the color is white (C=M=Y=K: 0%), and therefore, the signal value of white (C=M=Y=K: 0%) remains unconverted.

The image data on which the toner save processing such as the above has been performed is sent to the gamma processing unit 305. Then, gamma adjustment is performed in the gamma processing unit 305 and the image data is further converted into 4-bit image data in the halftone processing unit 306 and sent out to the printer unit 103.

As above, according to the present embodiment, in the toner save mode, the color of the pixel of the edge portion in the input image data at the time of color printing is converted into an achromatic color, and the chromatic color of the pixel of the non-edge portion is left unconverted but its density is decreased. Due to this, it possible to keep the visual recognizability of the image while reducing the toner consumption.

Second Embodiment

In the first embodiment, the color of the pixel of the edge portion of the input image data is converted into an achromatic color and the density of the color of the pixel of the non-edge portion is decreased. But in the case where the object is a small character or complicated graphics, edges cluster together, and therefore, it is not possible to considerably reduce the toner consumption. Consequently, an aspect is explained as a second embodiment in which the toner consumption is reduced by thinning proximate edges in the case where edges cluster together. Explanation of the portions in common to those of the first embodiment is omitted or simplified and in the following, different points are explained mainly.

In the present embodiment, in the edge detection unit 303, after the edge detection processing described previously is performed, the processing to thin proximate edges, to be described below, is performed.

Figure 11:
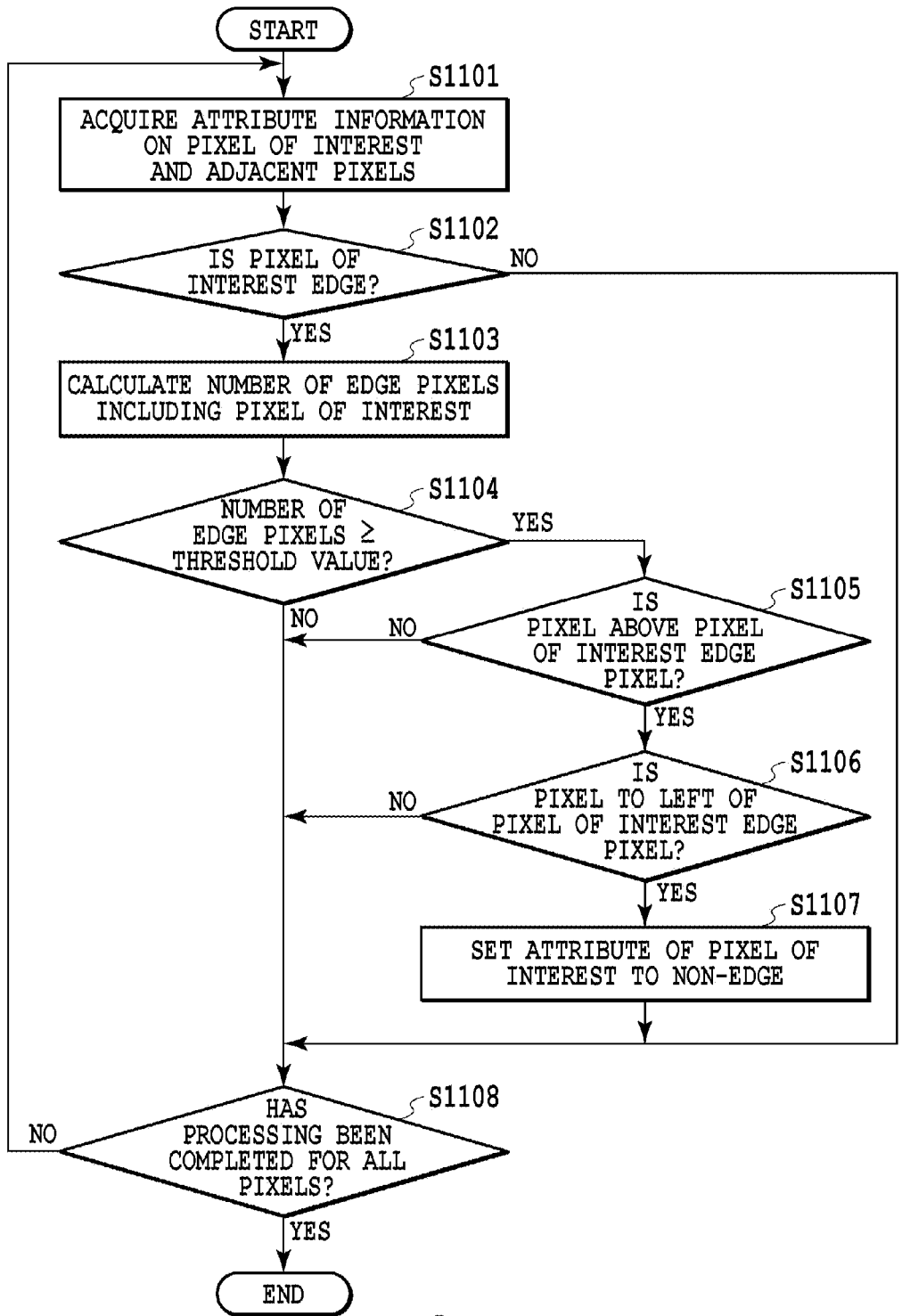
FIG. 11 is a flowchart showing a flow of proximate edge thinning processing according to a second embodiment.

FIG. 11 is a flowchart showing a flow of proximate edge thinning processing that is performed following the edge detection processing.

At step 1101, the edge detection unit 303 acquires attribute information on the pixel of interest within the input image data and adjacent pixels surrounding the pixel of interest. The relationship between the pixel of interest and the adjacent pixels is the same as that at step 401 of the edge detection processing. In other words, in the present embodiment also, the area of 3×3 pixels with the pixel of interest as a center is the range of the adjacent pixels and the eight pixels surrounding the pixel of interest are the adjacent pixels (see FIG. 5 described previously).

At step 1102, the edge detection unit 303 determines whether or not the pixel of interest is a pixel that constitutes an edge (whether the value of edge information is "1" or "0") based on the acquired attribute information on the pixel of interest. In the case where the pixel of interest is an edge pixel, the processing proceeds to step 1103. On the other hand, in the case where the pixel of interest is a non-edge pixel, the processing proceeds to step 1108.

At step 1103, the edge detection unit 303 calculates the number of pixels constituting an edge (hereinafter, the number of edge pixels) by referring to the attribute information on all the nine pixels including the pixel of interest and the adjacent pixels together. At the time of calculation, in the case where the range of the adjacent pixels that are referred to at step 1101 is not the area of 3×3 pixels, but, for example, an area of 5×5 pixels, the attribute information on all the 25 pixels including the pixel of interest are referred to and then the number of edge pixels is calculated.

At step 1104, the edge detection unit 303 determines whether or not the calculated number of edge pixels is equal to or greater than a predetermined threshold value. Here, the predetermined threshold value is an arbitrary value that is determined in advance by taking into consideration the relationship with the number of adjacent pixels that are referred to, and in the case where the number of adjacent pixels is eight, a value, for example, "6", is set as a threshold value. In the case where the calculated number of edge pixels is equal to or greater than the threshold value, it is determined that edges cluster together and the processing proceeds to step 1105. On the other hand, in the case where the calculated number of edge pixels is less than the threshold value, it is determined that edges do not cluster together and the processing proceeds to step 1108. Due to this, the contents of the attribute information on the pixel of interest are held as an edge (in other words, the value of edge information is kept to "1").

At step 1105, the edge detection unit 303 refers to the pixel located above the pixel of interest among the pixels adjacent to the pixel of interest and determines whether or not the pixel is a pixel constituting an edge (whether the value of edge information is "1" or "0"). In the case where the pixel above the pixel of interest is a pixel constituting an edge, the processing proceeds to step 1106. On the other hand, in the case where the pixel above the pixel of interest is not a pixel constituting an edge, the processing proceeds to step 1108. Due to this, the contents of the attribute information on the pixel of interest are held as an edge.

At step 1106, the edge detection unit 303 refers to the pixel located to the left of the pixel of interest among the pixels adjacent to the pixel of interest and determines whether or not the pixel is a pixel constituting an edge. In the case where the pixel to the left of the pixel of interest is a pixel constituting an edge, the processing proceeds to step 1107. On the other hand, in the case where the pixel to the left of the pixel of interest is not a pixel constituting an edge, the processing proceeds to step 1108. Due to this, the contents of the attribute information on the pixel of interest are held as an edge.

At step 1107, the edge detection unit 303 determines the pixel of interest to be the pixel to be thinned and changes the value of the attribute information on the pixel of interest to "0" indicating a non-edge.

At step 1108, the edge detection unit 303 determines whether the proximate edge thinning processing has been performed on all the pixels of the input pixel data. In the case where there is a pixel on which the processing has not been performed yet, the processing returns to step 1101, and the next pixel of interest is set and the processing is continued. On the other hand, in the case where the processing has been performed on all the pixels, the present processing is terminated.

The above is the contents of the proximate edge thinning processing.

In the flowchart in FIG. 11 described above, in the case where the number of edge pixels is equal to or greater than the threshold value, whether the pixels located "above and to the left" of the pixel of interest are pixels constituting an edge is determined (step 1105 and step 1106). The original purposes of these two steps are to change the attribute of one of the pixels into the attribute of a non-edge because both the two pixels are detected as an edge in the case where the object is a thin line having a width of two pixels. Consequently, as long as this can be implemented, a combination of "pixels above and to the right of the pixel of interest", "pixels below and to the left of the pixel of interest", or "pixels below and to the right of the pixel of interest" may be accepted.

Figure 12A:
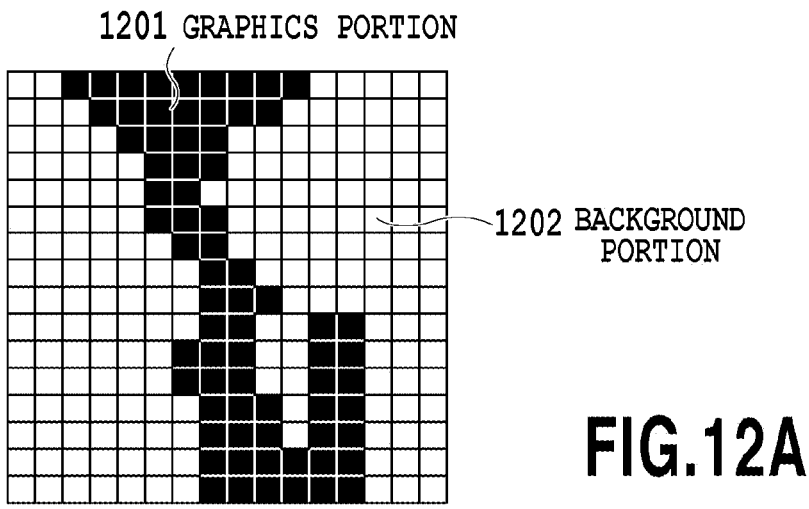
FIGS. 12A, 12B, and 12C are diagrams explaining the way part of pixels constituting an edge are thinned by the proximate edge thinning processing.
Figure 12B:
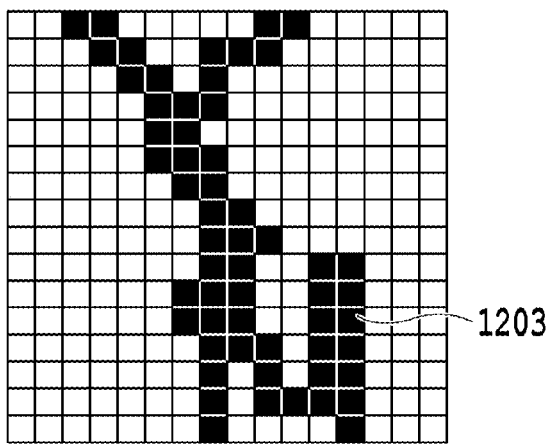
Figure 12C:
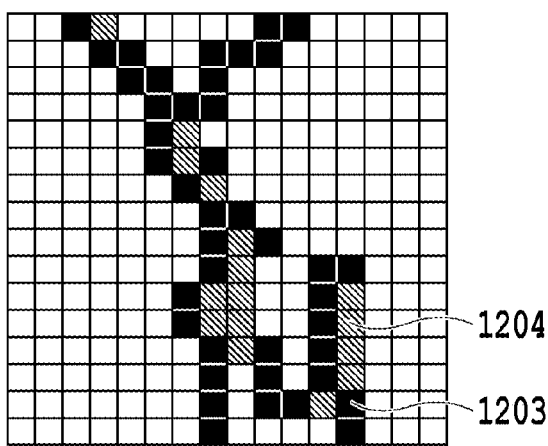

FIGS. 12A, 12B, and 12C are diagrams explaining the way part of the pixels constituting an edge are thinned by the proximate edge thinning processing.

FIG. 12A shows input image data and a graphics portion 1201 is represented in gray and a background portion 1202 is represented in white.

FIG. 12B shows the results (attribute bitmap) by performing the edge detection processing on the input image data in FIG. 12A, and an edge portion 1203 is represented in black. In the case where the edge detection processing is performed on the image data as shown in FIG. 12A, each boundary between the object (graphics) and the background is detected as an edge, and therefore, in the case where the interval is narrow, most portions of the graphics portion 1201 are detected as an edge as shown in FIG. 12B. As a result of this, there is no longer a difference between the number of pixels of the edge portion 1203 and the number of pixels of the graphics portion 1201. In the example in FIGS. 12A, 12B, and 12C, while the number of pixels of the character portion 1201 is "71", the number of pixels of the edge portion 1203 is "57", i.e., the number of pixels whose density is decreased by the toner save processing is only "14", and therefore, the amount of reduction in toner consumption will be small.

FIG. 12C shows the results (attribute bitmap) after the pixels constituting an edge are thinned by the proximate edge thinning processing. In FIG. 12C, a portion 1204 indicated by slashes shows the pixels that have been thinned (pixels whose attribute has been changed from edge into non-edge).

In FIG. 12C, the number of pixels of the edge portion 1203 is reduced down to "42", and therefore, the number of pixels whose density is decreased by the toner save processing increases up to "29", and it is known that the amount of reduction in toner consumption is doubled. The number of pixels of the non-edge and the graphics portion 1201 is "30". In this manner, by thinning pixels while leaving edges for keeping the visual recognizability of the graphics portion 1201, it is possible to increase the number of pixels whose density is decreased by the toner save processing, and to increase the amount of reduction in toner consumption even in the case where the object is a small character or complicated graphics.

As above, according to the present embodiment, even in the case where the object to be drawn is a small character or complicated graphics, it is possible to implement a reduction in toner consumption to a certain extent while keeping visual recognizability.

Third Embodiment

In the case where an object to be drawn is a specific kind of object having a complicated shape, such as a character, the number of edge portions is great. In the first and second embodiments, the edge pixel of the input image data is detected and the color of the edge pixel is converted into an achromatic color, but in the case where the object is a character or the like and number of edge portions is great, there is a possibility that visual recognizability will be degraded because the original color of the object to be drawn cannot be identified. Consequently, an aspect is explained as a third embodiment in which in the case where the object to be drawn is an object having a complicated shape, such as a character, the color of the pixel of the edge portion is not converted into an achromatic color, but is drawn with the original color. Explanation of the portions in common to those of the first and second embodiments is omitted or simplified and in the following, different points are explained mainly.

Figure 13:
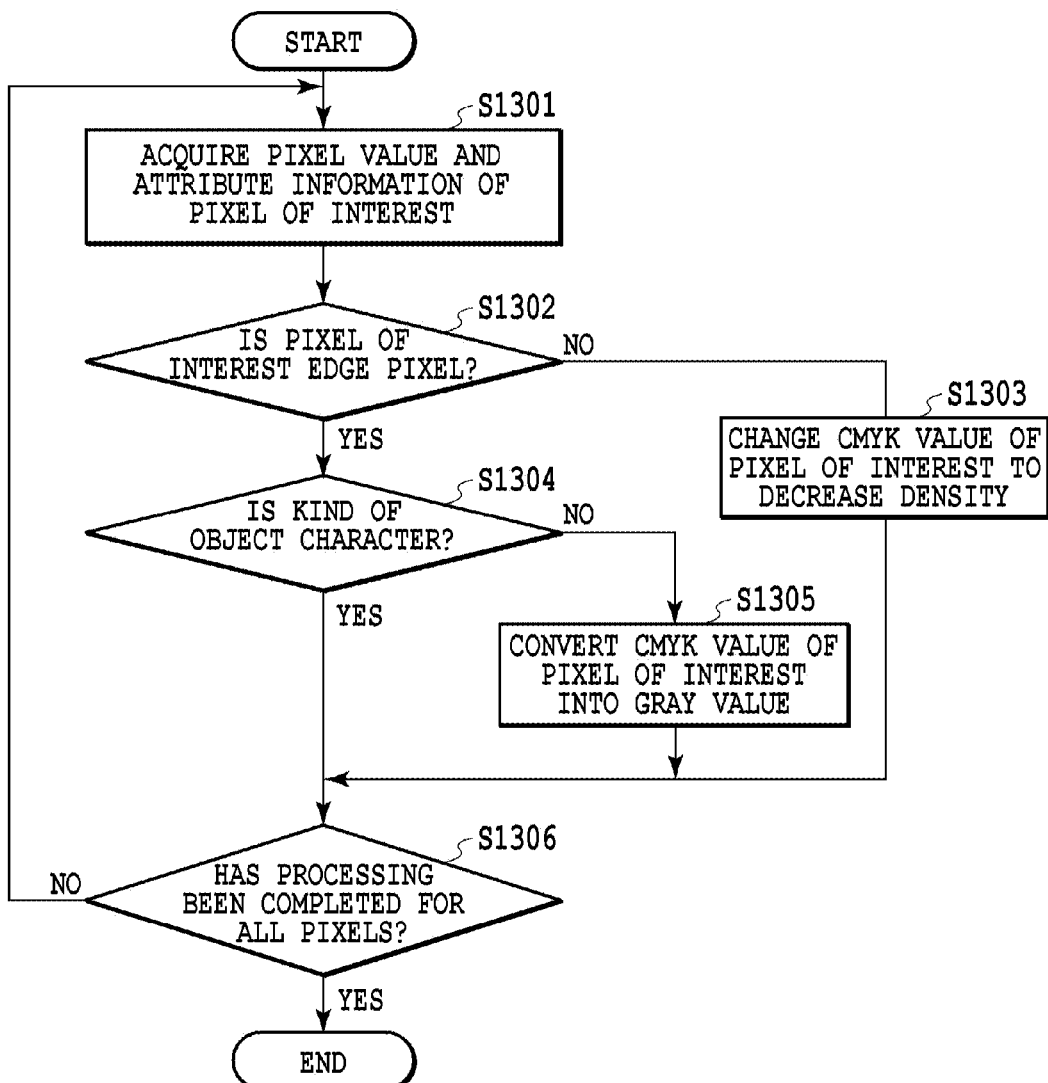
FIG. 13 is a flowchart showing a flow of toner save processing according to a third embodiment.

FIG. 13 is a flowchart showing a flow of toner save processing according to the present embodiment. At step 1301, the density adjustment unit 304 determines the pixel of interest of the toner save processing from the image data to be printed, and acquires its pixel value and attribute information. At step 1302, the density adjustment unit 304 determines whether or not the pixel of interest is a pixel constituting an edge by referring to the acquired attribute information. In the case where the pixel of interest is an edge pixel, the processing proceeds to step 1304. On the other hand, in the case where the pixel of interest is a non-edge pixel, the processing proceeds to step 1303.

At step 1303, the density adjustment unit 304 changes the CMYK value of the pixel of interest so that the density thereof becomes lower (the density is decreased). Details thereof are as explained at step 805 of the first embodiment.

At step 1304, the density adjustment unit 304 determines whether or not the kind of object to which the pixel of interest belongs is a character by referring to the acquired attribute information. In the present embodiment, whether the three high-order bits of the attribute information are "001" representing a character is determined as a result. In the case where the kind of object to which the pixel of interest belongs is not a character, the processing proceeds to step 1305. On the other hand, in the case where the kind of object to which the pixel of interest belongs is a character, the processing proceeds to step 1306. Due to this, the pixel value with its chromatic color is maintained unconverted (the CMYK value is held).

At step 1305, the density adjustment unit 304 converts the pixel value of the pixel of interest represented by the CMYK value acquired at step 1301 into a Gray value (value of K alone). Details thereof are as explained at step 804 of the first embodiment.

At step 1306, the density adjustment unit 304 determines whether or not the processing has been completed for all the pixels of the image data. In the case where there is a pixel on which the processing has not been performed yet, the processing returns to step 1301, and the next pixel of interest is determined and the processing is continued. On the other hand, in the case where the processing has been completed for all the pixels, the present processing is terminated.

The above is the contents of the toner save processing according to the present embodiment. At step 1304 described above, the processing is branched according to whether the kind of object to which the pixel of interest belongs is a character, but a character is one example of the object having a complicated shape, and branching of the processing does not depend on a character alone. What is required is that it is possible to determine whether the pixel of interest is a pixel that belongs to an object having a number of edge portions.

According to the present embodiment, in the case where an object to be drawn has a complicated shape, such as a character, the original color is maintained, and therefore, it is possible to reduce toner consumption without degrading the character visual recognizability.

The present embodiment is explained by taking toner as a color material, but ink that is used in an inkjet printer may be accepted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where processing to reduce a color material is instructed, it is possible to suppress the color material consumption while keeping the visual recognizability of an image by converting the color of an edge portion within the image into an achromatic color.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-165083, filed Aug. 14, 2014, which is hereby incorporated by reference wherein in its entirety.

What is claimed is:

1. An image processing apparatus comprising:
a memory storing instructions;
one or more processors which execute the instructions and cause the image processing apparatus to function as:
a setting unit configured to set a toner save mode in which printing is performed by saving a toner consumption as compared to a normal printing mode;
an edge detection unit configured to detect an edge portion of an object in a color image, the color image including at least one pixel which is a chromatic color including C, M, Y, K color components, at least one color component of the chromatic color including C, M, Y, K color components having a value of 1 or more among the C, M, Y color components; and
a conversion unit operable in a case where the toner save mode is set, wherein in the case where the toner save mode is set, the conversion unit is configured to,
decrease values of C, M, Y color components in the pixel, which is a chromatic color including C, M, Y, K color components, on the edge portion of the object detected by the edge detection unit in the color image and increase a value of K color component of the pixel, and
decrease values of the C, M, Y, K color components in the pixel, which is a chromatic color including C, M, Y, K color components, on other than the edge portion of the object detected by the edge detection unit in the color image to result in values of the C, M, Y, K color components representing a chromatic color paler than the chromatic color.

2. The image processing apparatus according to claim 1, wherein the edge detection unit further includes a determination unit configured to determine, in a case where a pixel of interest within the color image is the pixel of the edge portion, whether or not the number of the pixels of the edge portion within a predetermined area including the pixel of interest is equal to or greater than a predetermined threshold value, and, in a case where the determination unit determines that the number of the pixels of the edge portion is equal to or greater than a predetermined threshold value, on a condition that pixels adjacent to the pixel of interest are the edge pixel, the conversion unit regards the pixel of interest as the pixel of the non-edge portion and decreases the values of the color components for the pixel of the non-edge portion.

3. The image processing apparatus according to claim 2, wherein the adjacent pixels are any of combinations of pixels above and to the left of the pixel of interest, pixels above and to the right of the pixel of interest, pixels below and to the left of the pixel of interest, and pixels below and to the right of the pixel of interest.

4. The image processing apparatus according to claim 1, wherein in a case where an object within the color image is a specific kind of object, the conversion unit maintains the color and density of the color of the pixel of the edge portion having the chromatic color without converting the color thereof into an achromatic color.

5. The image processing apparatus according to claim 4, wherein the specific kind of object is a character.

6. The image processing apparatus according to claim 1, wherein the conversion unit decreases the values of the color components for the pixel of the non-edge portions by using a lookup table in which input density values are associated with output density values.

7. The image processing apparatus according to claim 6, wherein the lookup table is common to each color.

8. The image processing apparatus according to claim 6, wherein the lookup table is provided separately for each color.

9. The image processing apparatus according to claim 1, wherein in the chromatic color including C, M, Y, K color components having a value of 1 or more among the C, M, Y color components, at least one of the C, M, Y color components differs from another of the C, M, Y color components.

10. An image processing method comprising the steps of:
setting a toner save mode in which printing is performed by saving a toner consumption as compared to a normal printing mode;
detecting an edge portion of an object in a color image, the color image including at least one pixel which is a chromatic color including C, M, Y, K color components, at least one color component of the chromatic color including C, M, Y, K color components having a value of 1 or more among the C, M, Y color components; and
in a case where the toner save mode is set,
decreasing values of C, M, Y color components in the pixel, which is a chromatic color including C, M, Y, K color components, on the edge portion of the object detected by the edge detection step in the color image and increasing a value of K color component of the pixel, and
decreasing values of the C, M, Y, K color components in the pixel, which is a chromatic color including C, M, Y, K color components, on other than the edge portion of the object detected by the edge detection step in the color image to result in values of the C, M, Y, K color components representing a chromatic color paler than the chromatic color.

11. The image processing method according to claim 10, further comprising a determining step to determine, in a case where a pixel of interest within the color image is the pixel of the edge portion, whether or not the number of the pixels of the edge portion within a predetermined area including the pixel of interest is equal to or greater than a predetermined threshold value, and,
in a case where the determination step determines that the number of the pixels of the edge portion is equal to or greater than a predetermined threshold value, on a condition that pixels adjacent to the pixel of interest are the edge pixel, the pixel of interest is regarded as the pixel of the non-edge portion and the values of the color components for the pixel of the non-edge portion are decreased.

12. The image processing method according to claim 11, wherein the adjacent pixels are any of combinations of pixels above and to the left of the pixel of interest, pixels above and to the right of the pixel of interest, pixels below and to the left of the pixel of interest, and pixels below and to the right of the pixel of interest.

13. The image processing method according to claim 10, wherein in a case where an object within the color image is a specific kind of object, the color and density are maintained for the color of the pixel of the edge portion having the chromatic color without converting the color thereof into an achromatic color.

14. The image processing method according to claim 13, wherein the specific kind of object is a character.

15. The image processing method according to claim 10, wherein the values of the color components for the pixel of the non-edge portions are decreased by using a lookup table in which input density values are associated with output density values.

16. The image processing method according to claim 15, wherein the lookup table is common to each color.

17. The image processing method according to claim 15, wherein the lookup table is provided separately for each color.

18. The image processing method according to claim 10, wherein in the chromatic color including C, M, Y, K color components having a value of 1 or more among the C, M, Y color components, at least one of the C, M, Y color components differs from another of the C, M, Y color components.

19. A non-transitory computer readable storage medium storing a program for causing a computer to perform the following steps of:
setting a toner save mode in which printing is performed by saving a toner consumption as compared to a normal printing mode;
detecting an edge portion of an object in a color image, the color image including at least one pixel which is a chromatic color including C, M, Y, K color components, at least one color component of the chromatic color including C, M, Y, K color components having a value of 1 or more among the C, M, Y color components; and
in a case where the toner save mode is set,
decreasing values of C, M, Y color components in the pixel, which is a chromatic color including C, M, Y, K color components, on the edge portion of the object detected by the edge detection step in the color image and increasing a value of K color component of the pixel, and
decreasing values of the C, M, Y, K color components in the pixel, which is a chromatic color including C, M, Y, K color components, on other than the edge portion of the object detected by the edge detection step in the color image to result in values of the C, M, Y, K color components representing a chromatic color paler than the chromatic color.

* * * * *